United States Patent
Heemskerk

[11] Patent Number: 6,031,815
[45] Date of Patent: Feb. 29, 2000

[54] INFORMATION CARRIER CONTAINING AUXILIARY INFORMATION, READING DEVICE AND METHOD OF MANUFACTURING SUCH AN INFORMATION CARRIER

[75] Inventor: Jacobus P. J. Heemskerk, Eindhoven, Netherlands

[73] Assignee: U.S. Philips Corporation, New York, N.Y.

[21] Appl. No.: 08/873,261

[22] Filed: Jun. 11, 1997

[30] Foreign Application Priority Data

Jun. 27, 1996 [EP] European Pat. Off. .............. 96201760
Nov. 22, 1996 [EP] European Pat. Off. .............. 96203289

[51] Int. Cl.[7] ........................................................ G11B 7/24
[52] U.S. Cl. ......................................................... 369/275.3
[58] Field of Search ............................ 369/275.3, 275.4, 369/58, 275.2, 54; 386/126

[56] References Cited

U.S. PATENT DOCUMENTS

| 5,253,131 | 10/1993 | Chevalier | 360/78.14 |
| 5,321,675 | 6/1994 | Ito et al. | 369/32 |
| 5,452,285 | 9/1995 | Monen | 369/275.3 |
| 5,572,507 | 11/1996 | Ozaki et al. | 369/275.4 |
| 5,696,757 | 12/1997 | Ozaki et al. | 369/275.4 |
| 5,724,327 | 3/1998 | Timmermans et al. | 369/58 |
| 5,724,338 | 3/1998 | Birukawa et al. | 369/275.2 |
| 5,754,506 | 5/1998 | Nagasawa et al. | 369/275.4 |

FOREIGN PATENT DOCUMENTS

| 0397238A1 | 11/1990 | European Pat. Off. . |
| 0522750A2 | 1/1993 | European Pat. Off. . |
| 0545472A1 | 6/1993 | European Pat. Off. . |

*Primary Examiner*—Tan Dinh

[57] ABSTRACT

A system for controlled reproduction of information according to the invention comprises an information carrier and a reading device. The information carrier contains information in blocks written in a track. The information carrier has reference patterns which divide the track into sectors for writing the information blocks, and auxiliary information written in the reference patterns. The auxiliary information is related to the information, for example, a decoding key, access code or digital signature. The reading device comprises a demodulation means for recovering both the information and the auxiliary information. The device may include means for processing the information and/or auxiliary information in dependence on the auxiliary information. Since the auxiliary information cannot be transferred to an illegal copy, this copy is unusable.

18 Claims, 3 Drawing Sheets

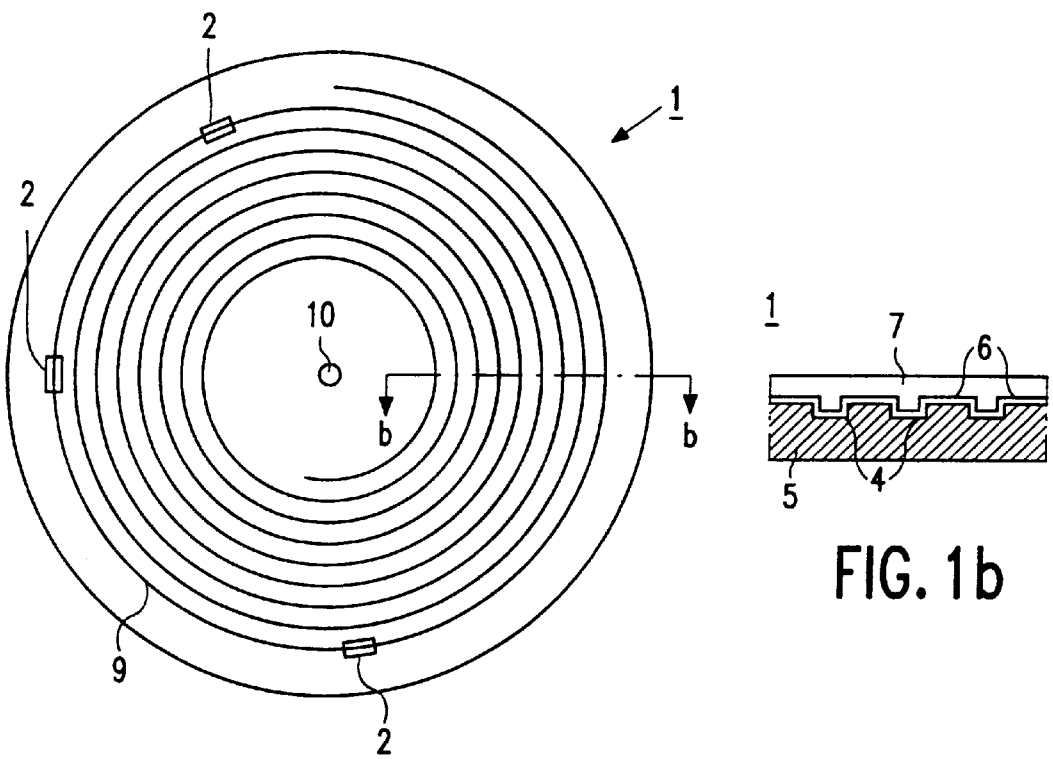
FIG. 1b
FIG. 1a
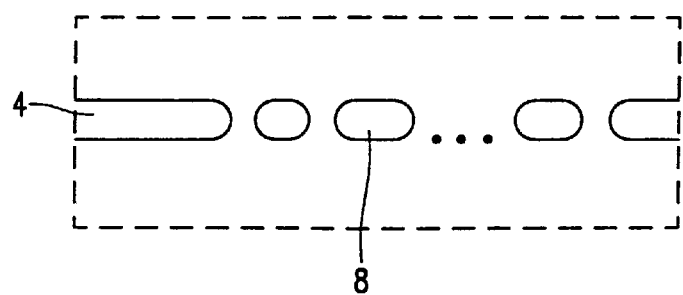
FIG. 1c

INFORMATION CARRIER CONTAINING AUXILIARY INFORMATION, READING DEVICE AND METHOD OF MANUFACTURING SUCH AN INFORMATION CARRIER

FIELD OF THE INVENTION

The invention relates to an information carrier which comprises a track for writing patterns which represent information in a predefined manner and for writing related auxiliary information.

The invention further relates to a reading device for reproducing information from an information carrier, the information carrier comprising a track for writing patterns which represent information in a predefined manner and for writing related auxiliary information, the device comprising reading means for reading the patterns, and a demodulation means for recovering the information from the read signal in a predefined manner, and means for recovering the auxiliary information.

The invention further relates to a method of manufacturing an information carrier which comprises a track for writing patterns which represent information in a predefined manner and for writing related auxiliary information, the auxiliary information being determined in dependence on the information.

BACKGROUND

Such an information carrier and reading device are known from EP-0545472. The known information carrier comprises a prearranged guiding track, a so-called pregroove. In the track determined by the pregroove, information which is written in a predefined manner is represented in optically readable patterns which are formed by variation of a first physical parameter, such as the height of the scanned surface. The pregroove has variations in a second physical parameter, such as an excursion in transverse direction, also denoted as wobble. Pregroove wobble is FM modulated and this modulation represents auxiliary information which is related to the information such as, for example, a descramble code for recovering information stored as scrambled information. The known device comprises reading means for reading the patterns and recovering means for recovering the auxiliary information. The known device and information carrier form a system for controlled information reproduction. For this purpose, the device comprises means for reproducing the information in dependence on the auxiliary information. If the information is copied on a writable information carrier, the information of this copy will not be reproduced, because during the writing process only the patterns are written and the copy itself does not contain any auxiliary information.

A problem in the known device is that auxiliary information is to be recovered from variations in a second physical parameter, which parameter represents auxiliary information in a manner different from the written patterns. As a result, the means for recovering the auxiliary information are complex.

SUMMARY OF THE INVENTION

It is an object of the invention to provide means for reproducing information in a controlled manner, in which auxiliary information can be recovered in a simple and cost-effective manner. For this purpose, the information carrier according to the invention is characterized in that the information carrier comprises reference patterns which divide the track into areas for writing the information in blocks, which reference patterns represent the auxiliary information in the predefined manner. For this purpose, the reading device according to the invention is characterized in that the demodulation means comprises the means for recovering the auxiliary information from reference patterns available on the information carrier, which reference patterns divide the track into areas for writing the information in blocks. For this purpose, a method according to the invention is characterized in that the information carrier is provided with reference patterns which divide the track into areas for writing the information in blocks, which reference patterns represent the auxiliary information in the predefined manner.

The measures according to the invention may lead to recovering the auxiliary information from the information carrier via the demodulation means, because both the information and the auxiliary information is represented in the predefined manner. This is advantageous in that the means for recovering the auxiliary information may be simple.

A further embodiment of the information carrier according to the invention is characterized in that the auxiliary information comprises check information related to a function of the information, which check information is to be applied when the information is processed for the function to be executed. This is advantageous in that the use of the information, such as video information, or a computer program, depends on the auxiliary information. As a result, a copy of the information carrier without the auxiliary information is unusable.

A further embodiment of the information carrier according to the invention is characterized in that the information carrier is of a writable type on which the information can be written via a writing process, while the reference patterns are not erasable. The information carrier may, for example, be one of an optically readable type for which the reference patterns are to be written once or are written in a non-erasable manner during the manufacturing process. This is advantageous in that the auxiliary information cannot be changed any more.

A further embodiment of the information carrier according to the invention is characterized in that the reference patterns contain marks whose centers are shifted relative to the middle of the track. A standard writing device will not be designed for introducing marks on shifted positions. This is advantageous in that a copy which includes auxiliary information cannot be made on such a standard writing device.

A further embodiment of the information carrier according to the invention is characterized in that the reference patterns are present only in a predetermined part of the track. This is advantageous in that the part of the track not comprising reference patterns may be formatted according to an existing information recording standard, such as DVD-ROM. The predetermined part, e.g. located in a lead-in area, comprising the auxiliary information will be read only by a reading device according to the invention, while undisturbed reading of information according to the standard by a standard reading device is possible.

An embodiment of the reading device according to the invention is characterized in that the device comprises means for processing the information and/or the auxiliary information in dependence on the auxiliary information. The information may then be coded (scrambled or encrypted), and the auxiliary information may comprise a decoding key. This is advantageous in that the reading device is capable of decoding the information and/or auxiliary information, whereas a standard reading device does not have access to the information. Moreover, the reading device according to the invention may read and process the auxiliary information, while not making the auxiliary information as such available to the user on an output of the device. This is advantageous in that the auxiliary information cannot be accessed by a user for creating illegal copies.

A further embodiment of the reading device according to the invention is characterized in that the auxiliary information contains check information related to a function of the information, and in that the information processing means are arranged for executing the function in dependence on the check information. This is advantageous in that the processing of the information, such as video information, or a computer program, is dependent on the auxiliary information. As a result, a copy of the information carrier without the auxiliary information is unusable, which provides a protection against illegal copies.

A further embodiment of the reading device according to the invention is characterized in that the device comprises means for detecting the position of the reference patterns relative to the track or other reference patterns. This is advantageous in that an illegal copy of controlled information comprising the reference patterns can be detected if the reference patterns are not positioned correctly, e.g. not shifted transversely, or not aligned in adjacent windings of the track.

These and other aspects of the invention will be apparent from and elucidated with reference to the embodiments described hereinafter.

BRIEF DESCRIPTION OF THE DRAWINGS

FIGS. 1(a–c) shows an information carrier of a writable type,

DETAILED DESCRIPTION OF PREFERRED EMBODIMENTS

Figure 2:
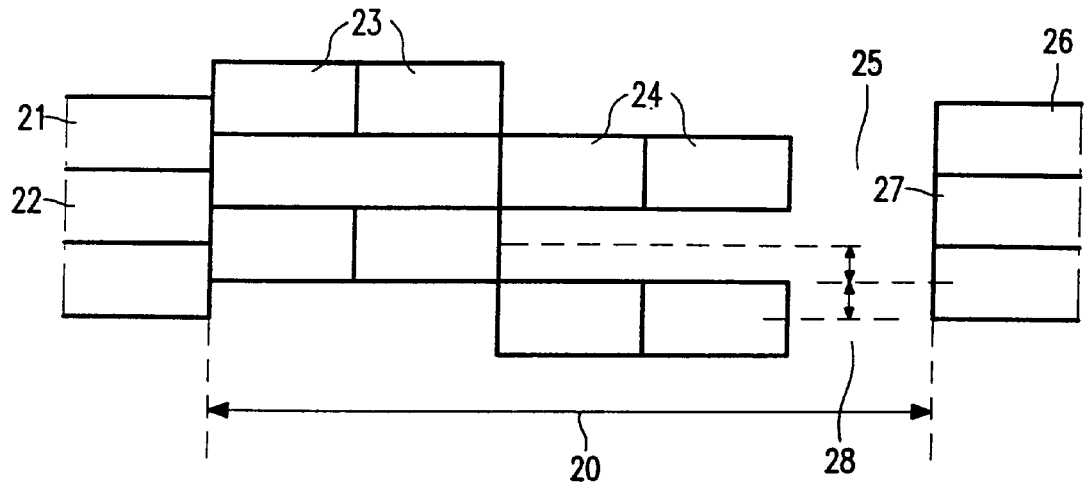
FIG. 2 diagrammatically shows a reference pattern.

In the drawing Figures, like elements which have already been described carry like reference characters.

FIG. 1a shows a disc-shaped information carrier 1 of an optically readable type. The information carrier comprises a track 9 intended for writing, which track is arranged in a helical pattern of windings. The windings may also be arranged concentrically in lieu of helically. The track 9 is indicated on the information carrier by a servopattern for enabling a read/write head to follow the track 9 during the scanning operation, which servopattern, for example, may be formed by a pregroove. A servopattern may also comprise, for example, regularly divided sub-patterns which periodically cause signals to occur in a tracking servo. FIG. 1b shows a section along line b—b of the information carrier 1, in which a transparent substrate 5 is covered by a recording layer 6 and a protective layer 7. The pregroove 4 may also be arranged as a raised part or have a material property different from its surroundings. Furthermore, it is possible to write the information alternately in a lowered or in a raised portion, a so-called Groove and Land servopattern. In that case, the lowered pregroove 4 (Groove) is as wide as the raised portion (Land) lying in between, and in the servopattern there is a change from land to groove or vice versa usually once per winding. Information on the information carrier is represented by patterns of optically readable marks. For example, the position and/or the length of the marks then represent a binary information signal. The marks may be introduced by presses, as is customary for read-only CDs, such as CD-ROM on which the pressed marks represent the information and provide the servopattern. In the case of a writable information carrier 1, the recording layer 6 can be optically or magneto-optically written by a device for writing information blocks. For forming patterns in the track 9, each mark is formed by one or more write pulses of a constant or a varying writing power which depends on, for example, the length of the mark. An example of a writable information carrier is the CD erasable which has a layer of phase-change material.

Reference patterns 2, which divide the track into areas, so-called sectors, for writing the information in blocks, are uniformly spaced in the servopattern. The sectors between the reference patterns 2 may be selected so short that a practicably usable amount of information fits into a sector as a block, for example, 512 byte or 2 Kbytes. A larger unit may also comprise a number of such units of e.g. 2 kByte and have a total length of e.g. 16 or 32 Kbyte. The larger unit may contain additional symbols for error correction, which error correction operates over the total length which is large relative to the errors to be expected. As a result, it is impossible to select a error-correctable unit arbitrarily small. In practice, a number of reference patterns per winding will be used. FIG. 1 shows only a few reference patterns 2.

FIG. 1c shows a reference pattern 2. The reference pattern 2 contains address information related to the location on the information carrier. The address information, gives, for example, the address of the sector situated behind the reference pattern and is represented by a series of marks 8. The address information is structured in a customary fashion, for example, first a synchronization component after which an address and error detection symbols follow. The position of a read/write head may be checked with this address information, so that information can be written in the desired sector.

FIG. 2 diagrammatically shows an embodiment of reference patterns 2 in several parallel tracks of a land/groove servopattern. The upper track 21 is a groove which is continued as groove 26 after the sectorheader 20 of the reference pattern. The second track 22 is a land and is continued after a sectorheader as a land 27. At least at one reference pattern per winding the land/groove will be alternated at a sectorheader, in that event the upper groove 21 is continued as a land 26 and the second track 22 is continued as a groove. The reference pattern at an alternation must therefore be aligned in adjacent tracks, further reference patterns per winding need not be aligned. The information in the reference pattern may be written in fields whose center is shifted relative to the middle of the track 9. In the case of shifted fields a less strong reading signal will be available, but this is still sufficient for recovering the address information written in the fields. In the case of aligned patterns, a 50% shift of the track pitch 28 can be utilized to advantage. A clearly different reading signal will then develop compared to non-shifted patterns and the shifted fields are equally well readable from the two adjacent tracks. The reference pattern shown in FIG. 2 is formed by 2 fields 23 shifted upwards, two fields 24 shifted downwards and an unwritten area 25. In the case of non-aligned reference patterns, a smaller shift or no shift at all should be used. According to the invention, auxiliary information is included in the reference patterns, for example, one of the shifted fields 23 or 24 may be used as auxiliary information. The auxiliary information is then represented by optically readable marks in like manner to which the information is represented in the sectors. The information is represented, for example, by the position and/or length of the marks like for the CD. Since the auxiliary information is represented in the same manner, both the information and the auxiliary information can be recovered by the same demodulator. The auxiliary information may contain, for example, a decoding key, a serial number, or access codes. In an embodiment, wherein address information is written successively or recurrently in the reference patterns, one of the recurrences may then be replaced by auxiliary information. In an embodiment of the information carrier according to the invention, the auxiliary information contains check information necessary for the use of the information. The check information is coupled to the ultimate function of the information in the intended application. This is advantageous in that the information reproduction and processing can be checked by the user in the device suitable for this purpose, since the check function of the information can only be realized in this device. For example, in the case of compressed video information, decompressing and reconstructing the video signal is the final function of the information. By coupling the check information to at least one of these functions, a proper protection against illegal copying is possible. Indeed, in that case there is no simple link between the auxiliary information and the other information. This is contrary to prior-art systems, such as, for example, a copy bit which denotes that the information must not be copied and is written on a fixed position on the information carrier, because in that case illegal modification is simple. In another embodiment, the information comprises a computer program and additional information is necessary when this program is run in the computer. During operation, the program then calls additional information when certain functions are executed. The check information is highly suitable as additional information. The computer program may then be installed on a computer system (on the hard disk), it is true, but for running the program (or parts thereof), the original information carrier is to be present.

A system for controlled reproduction of information according to the invention comprises an information carrier of the read-only type which contains information and reference patterns comprising auxiliary information, and a reading device. This read-only information carrier may be produced in a customary fashion, for example pressed like a CD, during which production the auxiliary information is included in the reference patterns. An information carrier of the read-only type according to the invention comprises the auxiliary information included in the reference patterns. This is an advantage, because on playback, this information is not freely available on the output of the device and is therefore not readily available for copying. If, for example, a video CD is read on a PC through a CD-ROM player, the auxiliary information is not accessible to the PC. In addition, there are information carriers of a writable type and devices for writing them, which information carriers, after being written, can basically be played back in a reading device, because information is written in similar manner, such as, for example, a CD-WO (Write Once). Such a writing device is generally not capable of writing arbitrary reference patterns. In an embodiment of a writable information carrier according to the invention, the reference patterns are not erasable. Such reference patterns may be produced by the manufacturer of a blank writable type of information carrier. This is advantageous in that, although a writing device may be capable of writing any arbitrary pattern, there is still no possibility of erasing the reference patterns and introducing them anew including the auxiliary information. An embodiment is an information carrier which comprises a pick-up layer of phase-change material and reference patterns via embossing. Another embodiment is an information carrier which comprises a write once pick-up layer in which reference patterns are already written on manufacturing. In another embodiment of the information carrier, the reference patterns containing the auxiliary information deviate from the further reference patterns, whereas a standard writing device cannot produce this deviation. A first example of deviation is that (some) reference patterns are shifted transversely to the track as described above. In another example, in a system in which rotation of the information carrier during reading and writing is controlled in a standard fashion at a Constant Linear Velocity (CLV), reference patterns on the information carrier are written in a Constant Angular Velocity (CAV) mode. In CLV mode, the disk rotation speed is adapted, so that the speed of the track relative to the recording position is constant, whereas in CAV the rotation speed is constant. In the case where a standard CLV writing device is capable of writing reference patterns, this device will still not be capable of writing CAV patterns as the rotation speed is controlled in CLV mode. An embodiment of the information carrier comprises said deviating reference patterns in a predetermined part of the track only. This predetermined part may be a lead-in or lead-out area, or a specific annularly shaped portion of the writable area on the information carrier. The reference patterns in this part comprising the auxiliary information will be read by a reading device according to the invention, while undisturbed reading of information in the further track by a standard reading device is possible. The part of the track not comprising reference patterns may be formatted differently, e.g. according to an existing information recording standard, such as DVD-ROM. If CAV mode reference patterns are used, the position of the reference patterns is known in adjacent windings. To detect illegal copies, the reading device should check whether the patterns are written in CAV mode, e.g. if they are positioned, as required, from track to track by skipping a few tracks and comparing the timing of the reference patterns in relation to the timing of the rotation of the information carrier. If shifted transversely, reference patterns are used, CAV reference patterns should be exactly aligned from winding to winding of the track. This is important for reliably reading a shifted pattern or adjacent main data, as non-aligned shifted patterns would cause radial crosstalk when read. To detect illegal copies, a reading device according to the invention checks the transverse shifting of the patterns, e.g. by analysing signals of subdetectors, to detect differences in reflected radiation caused by shifted patterns compared to non-shifted patterns. As a result of the need to write the reference patterns comprising the auxiliary information and deviating from standard reference patterns, generating an illegal copy on a standard writing device will be impossible. As an example, a write-once system according to the CD standard, which is known as CD-R, is able to record any desired information in blocks in CLV mode anywhere on a writable CD, including headers and synchronisation information as prescribed by the CD standards. However a CD-R writer cannot operate in CAV mode, as the speed of rotation and the location of recording the information blocks is determined by the pregroove servopattern. Therefore, a CD-R writer cannot align reference patterns, i.e. headers, in adjacent tracks. In addition, a CD-R writer cannot write any transversely shifted pattern. An embodiment of the information carrier of a writable type having such shifted reference patterns also comprises user data in a format as defined in a standard for Read-Only discs, a so called partial ROM disc. The writable format might comprise rules for this ROM part. Usually, the ROM part will comprise non-shifted reference patterns—like headers in groove-only ROM standards—in the usual track formed by pits.

Figure 3:
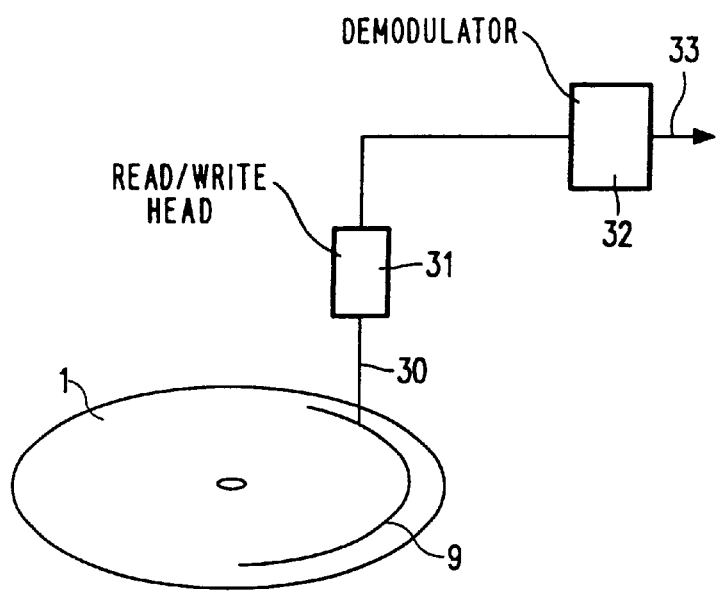
FIG. 3 shows a reading device for reproducing information.

FIG. 3 shows a device according to the invention for reading the disc-shaped information carrier 1. The device comprises a reading unit 31 for reading information blocks from the information carrier 1. The reading unit 31 scans the track 9 by a radiation beam 30. During the scanning operation, the reading unit 31 is positioned over the track 9 by a servosystem of a customary type (not shown). The information carrier 1 rotates, driven by driving means, while the reading unit 31 reads the track 9 by the beam 30 and converts the optically readable marks representing the information into an electric signal. The device further includes a demodulation means 32 for recovering the information. According to the invention, the auxiliary information is included in the reference patterns and the demodulation means 32 recovers information and auxiliary information in the same manner. The demodulation means 32 is arranged for distinguishing the type of information read out: information blocks, address information and auxiliary information. The information blocks are presented on the output 33 monitored by a system controller of a customary type (not shown). The address information is applied to the system controller for positioning the reading unit 31. The auxiliary information may be applied to the system controller and used for releasing the information blocks. For example, the system controller can check the auxiliary information based on predefined check numbers or check information can be derived from the information blocks. If there is no match, the output 33 will be blocked. In another embodiment of the device, the auxiliary information is also presented on the output 33 and is available to the user.

Figure 4:
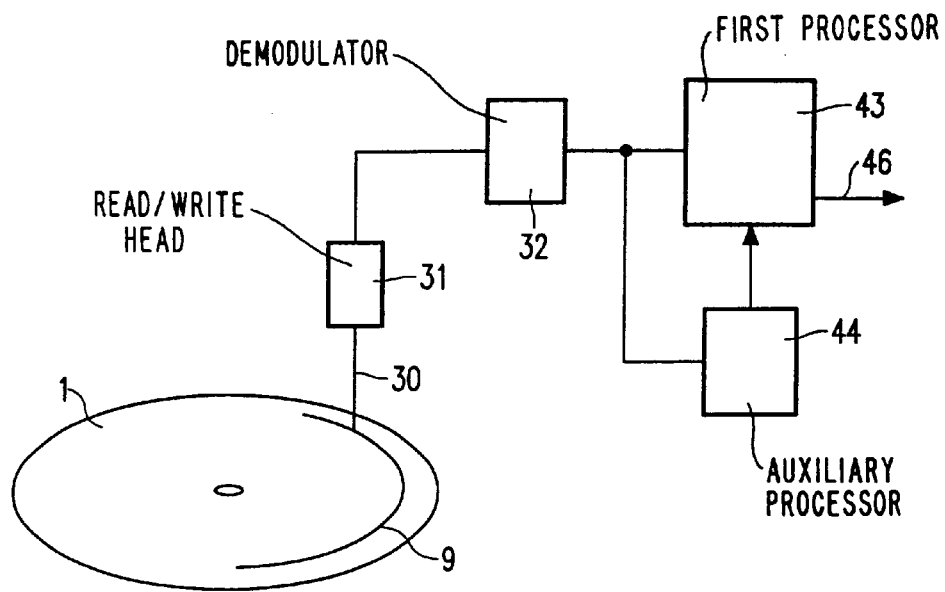
FIG. 4 shows a reading device for reproducing and processing information.

FIG. 4 shows a device according to the invention for reading the disc-shaped information carrier 1 and processing the information. The device corresponds to the device described above with reference to FIG. 3 including a reading unit 31 and a demodulation means 32 for recovering the information. According to the invention, the device comprises a processor 43 for processing the information and a processor means 44 for processing the auxiliary information, the two being coupled to the demodulation means 32. In a first embodiment, the processing means 44 is arranged for information block decoding for which a decoding key is derived from the auxiliary information by the processing means 44. The processor 43 is then arranged for descrambling or decrypting the information blocks in dependence on the decoding key. In a second embodiment, the processor 43 is arranged for executing a function of the information, for example, if the information blocks contain compressed MPEG2 video information, the recovery of the video signal. The auxiliary information contains check information necessary for the recovery. Without the auxiliary information, the video signal cannot be reconstructed. No auxiliary information or different auxiliary information is present on an illegal copy of the information carrier, so that the video signal cannot be reconstructed. In another embodiment, the video signal contains a so-called 'watermark' which marks a video signal. Video programs preferably have ever different watermarks for their identification, possibly including manufacturer or time of creation. The watermark may also be formed by specific compression parameter combinations which do not occur in video signals without a watermark. Such a watermark can be simply introduced upon encoding, but is well-nigh impossible to be added or changed later on in a video signal already compressed. The processor 43 is arranged for establishing a watermark in the video signal and, if available, checking the watermark against check information derived from the auxiliary information. Illegally copied video information can be blocked if there is no match between the check information and the watermark. It is then an advantage that the detection of the watermark and the matching against the check information takes place directly upon reading. The watermark is preferably detectable without decompressing the video information completely, so that the processor 43 may be of a simpler type.

Figure 5:
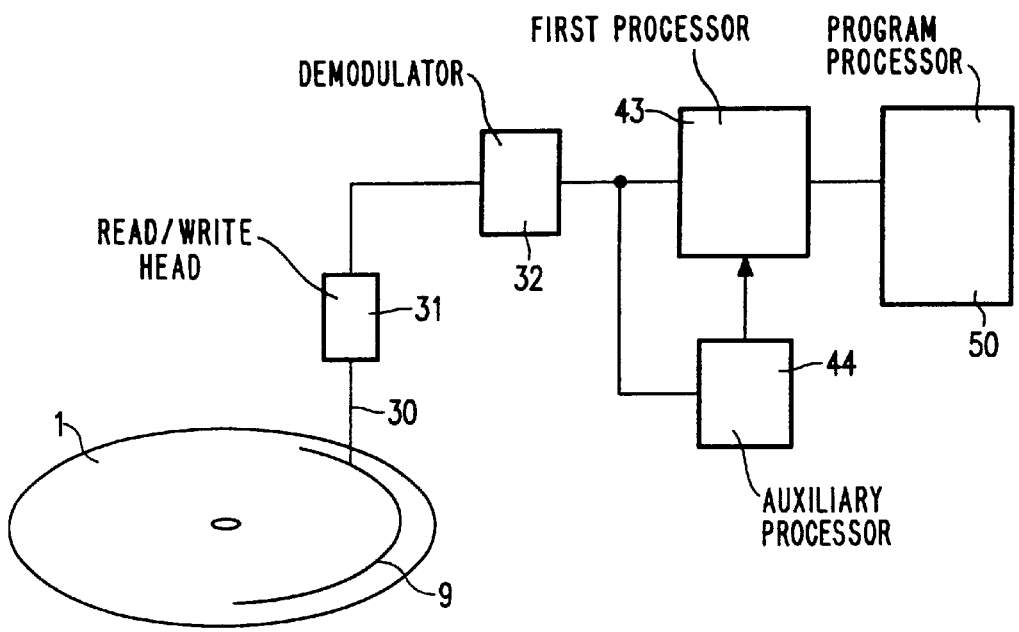
FIG. 5 shows an arrangement for reproducing and processing a computer program.

FIG. 5 shows a device according to the invention for reading the disc-shaped information carrier 1 and processing the information. The device corresponding to the device described above with reference to FIG. 4 comprises a reading unit 31, a demodulation means 32 for recovering the information, a processor 43 for processing the information and a processing means 44 for processing the auxiliary information. The device further comprises a processing unit 50 for processing computer programs, which unit is coupled to the output of the processor 43 and to the system controller (not shown) via an interface. The information carrier contains a computer program in which a number of essential data are included just in the auxiliary information. They may be, for example, a decoding key, a serial number or access code or, possibly, a small part of the program code (a subroutine, object or module). Needing these essential data, the program can only function well if both the information blocks and the auxiliary information are available. In another embodiment, the processor 43 is arranged for selectively transferring part of the auxiliary information to the user. This is attractive, for example, when information reproduction is used in a computer system. Not transferring all the auxiliary information to the user provides a better protection of the information. When an illegal copy is then manufactured, it is impossible with a search routine to call all the auxiliary information of the information carrier and produce an auxiliary file on the illegal copy, by which file the auxiliary information can be rendered available when the illegal copy is used in a system. The part of the auxiliary information that can be transferred freely can relate, for example, to a fixed part of the information carrier or be included in the auxiliary information itself. The information comprises a computer program and the auxiliary information comprises codes which are fetched by the computer program at arbitrary instants during execution. If no codes or incorrect codes are reproduced when fetched, because an illegal copy of the software is used, the program will stop and thus be rendered useless.

The invention may also be applied to non-disc shaped information carriers, such as optical tapes or optical cards, which contain a servopattern of reference patterns. Alternatively, the invention may be applied to magnetic and other information carriers, provided they contain a servopattern of reference patterns in which auxiliary information can be accommodated in the reference patterns.

I claim:

1. An information carrier comprising:

a track for writing patterns which represent first information; and reference patterns on the information writing portion of the track which divide the track into multiple areas for writing the first information in blocks in the track, and which represent auxiliary information.

2. The carrier of claim 1, in which the auxiliary information includes check information related to a function of the first information, which check information is used for processing the first information for executing the function.

3. The carrier of claim 2, in which the first information includes video information which contains a check code, and processing of the video information depends on the check code and the check information.

4. The carrier of claim 2, in which the first information includes a computer program, and execution of the computer program depends on the check information.

5. The carrier of claim 1, in which the information carrier is of an optically readable type in which a binary information signal is represented by optically readable patterns.

6. The carrier of claim 1, in which the information carrier is of a writeable type on and adapted for writing the first information using a writing process, and the reference patterns are non-erasable.

7. The carrier of claim 1, in which the reference patterns include marks whose center is shifted relative to the middle of the track.

8. The carrier of claim 1, in which the reference patterns are present only in a predetermined part of the track.

9. The carrier of claim 1, in which the reference patterns are aligned in adjacent windings of the track.

10. A reading device for reproducing first information from an information carrier, the information carrier including: a track containing patterns on the information writing portion of the track which represent the first information; and reference patterns which represent related auxiliary information and which divide the track into areas for blocks for writing the first information in blocks, the device comprising:

reading means for reading the patterns, and demodulation means for recovering the first information from the read signal and for recovering the auxiliary information from the reference patterns.

11. The device of claim 10, in which the device includes: means for information processing, or means for auxiliary information processing depending on the auxiliary information, or both.

12. The device of claim 11, in which the auxiliary information includes check information related to a function of the first information, and the information processing means are arranged for executing the function depending on the check information.

13. The device of claim 11, in which the information includes video information which contains a check code, and the information processing means are arranged for processing the video information depending on the check code and the check information.

14. The device of claim 11, in which the information includes a computer program, and the information processing means are arranged for running the computer program depending on the check information.

15. The device of claim 11, in which the information includes a computer program, and the means for processing the auxiliary information are arranged for transferring the auxiliary information to the computer program while at least part of the auxiliary information is blocked.

16. The device of claim 10, further comprising means for detecting the position of the reference patterns relative to another structure of the information carrier selected from the group consisting of: the track; and another reference pattern.

17. A method of manufacturing an information carrier, comprising the steps of:

providing a track with a portion for writing patterns which represent first information, and providing reference patterns on the information writing portion of the track, which divide the track into areas for writing the first information in blocks, and which represent auxiliary information which depends on the first information.

18. The carrier of claim 1 in which the reference patterns are positioned adjacent to the track and include servo information for aligning a read/write head with the track.

* * * * *